(12) United States Patent
Weller

(10) Patent No.: US 11,215,308 B2
(45) Date of Patent: Jan. 4, 2022

(54) QUICK COUPLING DEVICE

(71) Applicant: Wenz Kunststoff GmbH & Co KG, Lüdenscheid (DE)

(72) Inventor: Karsten Weller, Lüdenscheid (DE)

(73) Assignee: Wenz Kunststoff GmbH & Co KG, Lüdenscheid (DE)

( * ) Notice: Subject to any disclaimer, the term of this patent is extended or adjusted under 35 U.S.C. 154(b) by 426 days.

(21) Appl. No.: 16/392,782

(22) Filed: Apr. 24, 2019

(65) Prior Publication Data

US 2019/0338877 A1 Nov. 7, 2019

(30) Foreign Application Priority Data

May 2, 2018 (EP) ..................................... 18170463

(51) Int. Cl.
*F16L 37/23* (2006.01)
*F16L 55/10* (2006.01)

(52) U.S. Cl.
CPC .......... *F16L 37/23* (2013.01); *F16L 55/1022* (2013.01); *F16L 2201/20* (2013.01)

(58) Field of Classification Search
CPC .... F16L 37/23; F16L 55/1022; F16L 2201/20
See application file for complete search history.

(56) References Cited

U.S. PATENT DOCUMENTS

| | | | | |
|---|---|---|---|---|
| 3,570,543 A * | 3/1971 | Ekman | ..................... | F16L 37/32 137/630 |
| 5,409,268 A | 4/1995 | Wagner | | |
| 6,027,097 A * | 2/2000 | Humphreys | ............ | F16L 37/23 251/149.1 |
| 6,082,399 A * | 7/2000 | Nyberg | .................... | F16L 37/23 137/614.03 |
| 6,511,100 B1 * | 1/2003 | Le Clinche | ............. | F16L 37/23 285/314 |
| 2002/0024217 A1 | 2/2002 | Mummert | | |
| 2005/0067837 A1 * | 3/2005 | Alexander | ............. | F16L 37/23 285/317 |
| 2016/0138744 A1 * | 5/2016 | Polgati | ................ | F16L 27/0828 285/276 |
| 2017/0363239 A1 | 12/2017 | Rusconi et al. | | |
| 2019/0040986 A1 * | 2/2019 | Liu | ......................... | F16L 37/38 |

FOREIGN PATENT DOCUMENTS

| | | |
|---|---|---|
| DE | 2617620 A1 | 11/1977 |
| DE | 69114715 | 7/1996 |
| FR | 2827647 A1 | 1/2003 |
| WO | 2016079563 A1 | 5/2016 |

* cited by examiner

*Primary Examiner* — Matthew Troutman
*Assistant Examiner* — James A Linford
(74) *Attorney, Agent, or Firm* — Smartpat PLC

(57) ABSTRACT

A quick coupling device for fluid lines comprises a coupling socket for receiving a coupling plug and a locking mechanism. It includes a locking sleeve axially displaceable on the coupling socket and at least one radially movable locking ball arranged in a bore of the coupling socket. The at least one locking ball is radially movable and lockable by the locking sleeve. The device includes a temperature-controlled locking element which is arranged on the coupling socket or on the locking sleeve and engages an undercut arranged in the locking sleeve or the coupling socket when a temperature threshold is exceeded.

6 Claims, 1 Drawing Sheet

QUICK COUPLING DEVICE

TECHNICAL FIELD

The disclosure relates to a quick coupling device for fluid lines, comprising a coupling socket for receiving a coupling plug and a locking device which has an axially displaceable locking sleeve on the coupling socket and at least one radially movable locking ball in a bore of the coupling socket, which at least one locking ball is radially inwardly movable and lockable via the locking sleeve.

BACKGROUND

Quick coupling devices of the aforementioned type are known in various designs and described for example in DE 26 17 620 A1. Such quick coupling devices serve to receive a coupling plug, which has recesses or an annular groove for the engagement of the locking balls. By moving the locking sleeve, the locking balls can be moved into the groove of the recesses of the coupling plug and radially locked therein, whereby the coupling plug is axially fixed in the coupling socket.

Quick coupling devices of the aforementioned type are used in particular for the connection of cooling lines of temperature control systems for injection molding. In those, the coolant flowing through the quick coupling device can reach temperatures of 70° C. and above. If a quick coupling of such a system is released before the coolant liquid has cooled sufficiently, it can lead to scalding of operating personnel.

SUMMARY

The invention aims to remedy this situation. The invention has for its object to provide a quick coupling device of the known type, in which a scalding of operating personnel is prevented by making it impossible to release the quick coupling device while the cooling medium is still hot. This object is achieved by a quick coupling device as claimed.

A quick coupling device is presented which prevents scalding of operating personnel by making it impossible to release the quick coupling device while a cooling medium flowing through the device is hot. This is accomplished by arranging a temperature-controlled locking member on the coupling socket or on the locking sleeve of the device. The locking member engages an undercut on the locking sleeve or the coupling socket when a temperature threshold is exceeded. The locking sleeve is thus blocked while the temperature control medium is hot, and cannot be axially displaced. It is not possible to release the quick coupling device when the temperature control medium is still hot.

Here, a temperature-controlled locking member refers to any component or an arrangement of components which changes its geometric shape due to a change in temperature.

In one example embodiment, the locking member comprises at least one expansion element and/or a bimetal part which deforms when exposed to heat in the direction of the undercut. This allows a reliable, temperature-dependent blocking of the locking sleeve.

The at least one bimetal part may be designed as a bimetallic strip. Such bimetallic strips consist of two metal strips with different coefficients of thermal expansion which are fixedly connected to one another at their ends, whereby a bending of the bimetallic strip is achieved in a defined direction when exposed to heat.

A plurality of bimetallic strips may be arranged circumferentially spaced around the coupling element. The undercut may be formed by a radially extending circumferential groove. Thereby, a circumferential uniform blocking of the locking sleeve is achieved when a temperature threshold is exceeded.

The circumferential groove may have a sawtooth-shaped cross-section. This allows arranging the bimetallic strip fully retractable in the coupling socket or in the locking sleeve, whereby an undesirable obstruction of the locking sleeve is avoided when the temperature control medium is cool.

The locking member may comprise circumferentially spaced metal strips, which are connected to an expansion element, by which they can be moved into the undercut when the temperature threshold is exceeded. In this case, the expansion element is preferably arranged annularly within a groove, whereby the direction of its expansion is defined. Instead of metal strips, for example, plastic strips may be used, which are preferably connected to one another at one end via a circumferential ring.

Generally speaking, the temperature dependent locking is based on the arrangement of a component which changes its geometric configuration as a function of the temperature and which causes a blocking fixing of the locking sleeve when a temperature threshold is exceeded so that the locking sleeve is no longer axially displaceable relative to the coupling socket.

The following detailed description is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
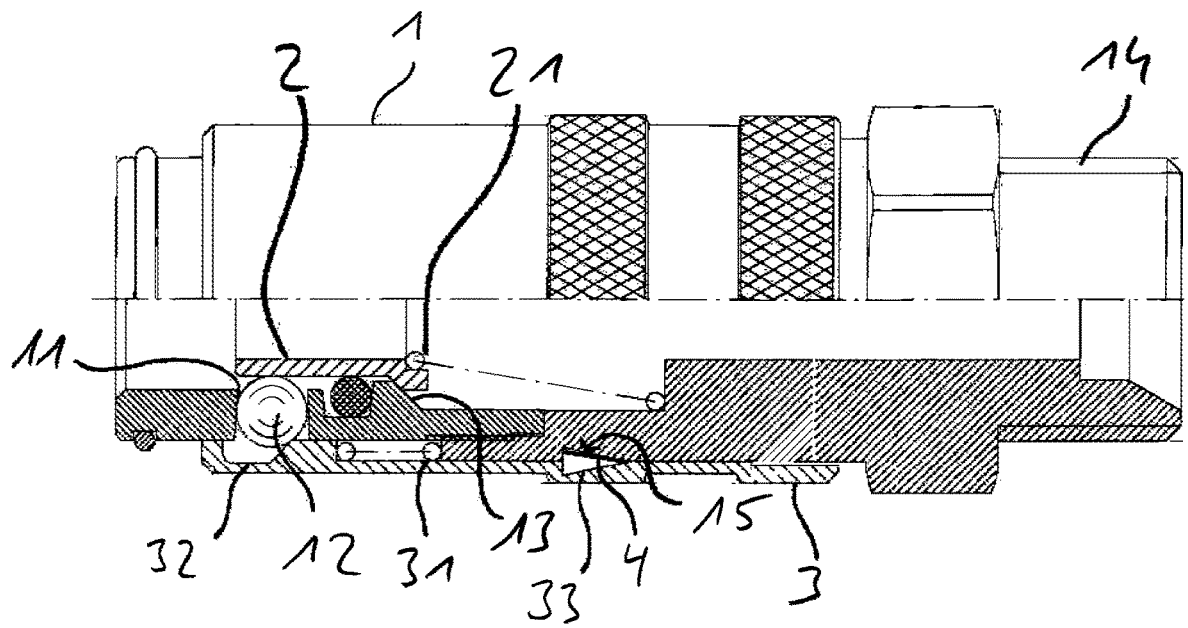
FIG. 1 shows a schematic representation of a quick coupling device.

The exemplary embodiment of a quick coupling device shown in FIG. 1 comprises a coupling socket 1, which is provided with bores 11 that receive locking balls 12. The bores 11 are configured to taper radially inwardly so that the locking balls 12 cannot completely pass through the bores 11. Inside of the coupling socket 1 an axially displaceable coupling sleeve 2 is arranged, which is biased by a first spring 21 in the direction of the locking balls 12 and bears against an inner circumferential shoulder 13. In this position, the radial movement of the locking balls 12 is prevented by the connection sleeve 2. Furthermore, the coupling socket 1 has an external thread 14 for connecting a line at its end opposite of the bores 11. On the coupling socket 1 an axially displaceable locking sleeve 3 is further arranged. The locking sleeve 3 is biased by a second spring 31 in the direction of the bores 11. At its end, the locking sleeve 3 has an inner circumferential groove 32 for slidingly receiving the locking balls 12 while the locking sleeve 3 is positioned in the unlocking direction against the bias of the second spring 31.

To connect a coupling plug (not shown) of a line which is to be connected to the quick coupling device, the coupling plug is inserted into the coupling socket 1. This causes the connection sleeve 2 to be pushed rearward against the biasing force of the first spring 21 towards the external thread 14. Thereby, the path for the locking balls 12 is cleared, and the locking balls are pushed by the abutting locking sleeve 3, which is biased by the second spring 31, into a circumferential groove which is arranged for that purpose on the coupling plug. The coupling plug is now axially fixed in the coupling socket. To release the connection, the locking sleeve 3 is moved against the bias of the spring 31 in the direction of the external thread 14, whereby the locking balls 12 can slide into the circumferential groove 32 of the locking sleeve 3. In this position, the coupling plug can be pulled out of the coupling socket 1, and at the same time, by the bias of the first spring 21, the connection sleeve 2 is moved back to its original position.

Figure 2:
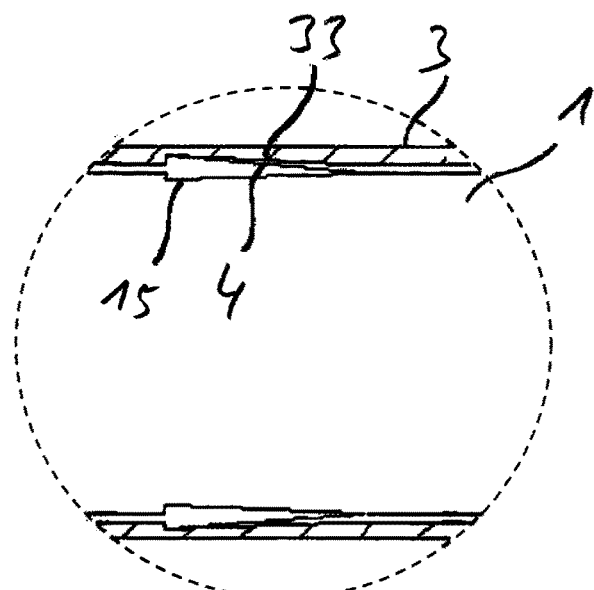
FIG. 2 shows a detailed representation of a locking member of the quick coupling device of FIG. 1 with a fixed locking sleeve.

In the coupling socket 1 a further outer circumferentially groove 15 with a sawtooth cross-section is provided, which is aligned in the closed position of the locking sleeve 3 with an inner circumferential groove 33 that is provided in the locking sleeve 3. (Shown in FIG. 1 is—purely for better understanding—an aligned positioning of the grooves 15, 33, even though the locking sleeve 3 is not in the locked position. In the illustrated position of the locking sleeve 3, the grooves 15, 33 are actually offset from one another.) The inner groove 33 of the locking sleeve 3 also has a sawtooth-shaped cross section. A circumferential channel is formed by the two grooves 15, 33 of the coupling socket 1 and the locking sleeve 3 in the closed position of the locking sleeve 3, a cross-section of which substantially corresponds to an isosceles triangle. In the groove 15 of the coupling socket 1, an otherwise freely movable bimetallic strip 4 is fixed on its side facing the external thread 14. The bimetallic strip 4 is completely received in the groove 15 at a temperature below a temperature threshold, which is 50° C. in the embodiment. The bimetallic strip 4 is formed such that it is curved when the temperature threshold, which is 50° C. in the exemplary embodiment, is reached. It then engages in the undercut formed by the groove 33 of the locking sleeve 3 and rests against an edge facing the locking balls 12, whereby the locking sleeve 3 is fixed. A displacement of the locking sleeve 3 along the coupling socket 1 is prevented in this position of the bimetallic strip 4. This blocking position of the bimetallic strip 4 is shown schematically in FIG. 2.

In another embodiment (not shown), a receiving groove for a ring-shaped expansion element is arranged in the groove 15 of the coupling socket 1, which rests against the strip. In this embodiment, the bending of the strip 4 is effected by expansion of the expansion element. The strip itself need not be formed as a bimetallic strip in this embodiment.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A quick coupling device for fluid lines, comprising:
   a coupling socket for receiving a coupling plug;
   a locking mechanism, which includes
     a locking sleeve axially displaceable on the coupling socket and
     at least one radially movable locking ball arranged in a bore of the coupling socket, which at least one locking ball is radially movable and lockable by the locking sleeve; and
   a temperature-controlled locking member arranged on the coupling socket or on the locking sleeve, which engages an undercut arranged in the locking sleeve or the coupling socket when a temperature threshold is exceeded.

2. The quick coupling device according to claim 1, wherein the temperature-controlled locking member comprises a bimetal part, which deforms, when exposed to heat, in the direction of the undercut.

3. The quick coupling device according to claim 2, wherein the bimetal part is arranged in a circumferential groove of the coupling socket or the locking sleeve.

4. The quick coupling device according to claim 1, wherein the temperature-controlled locking member comprises at least one bimetallic strip, which deforms, when exposed to heat, in the direction of the undercut.

5. The quick coupling device according to claim 4, wherein a plurality of bimetallic strips are arranged circumferentially spaced around the coupling socket, and wherein the undercut is formed by a radially extending circumferential groove.

6. The quick coupling device according to claim 5, wherein the circumferential groove has a sawtooth-shaped cross-section.

\* \* \* \* \*